United States Patent
Eronen et al.

(10) Patent No.: US 10,791,410 B2
(45) Date of Patent: Sep. 29, 2020

(54) AUDIO PROCESSING TO MODIFY A SPATIAL EXTENT OF A SOUND OBJECT

(71) Applicant: NOKIA TECHNOLOGIES OY, Espoo (FI)

(72) Inventors: Antti Eronen, Tampere (FI); Jussi Leppänen, Tampere (FI); Francesco Cricri, Tampere (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/465,393

(22) PCT Filed: Nov. 29, 2017

(86) PCT No.: PCT/FI2017/050838
§ 371 (c)(1),
(2) Date: May 30, 2019

(87) PCT Pub. No.: WO2018/100244
PCT Pub. Date: Jun. 7, 2018

(65) Prior Publication Data
US 2020/0008004 A1     Jan. 2, 2020

(30) Foreign Application Priority Data

Dec. 1, 2016   (GB) .................................. 1620422.4

(51) Int. Cl.
*H04S 7/00* (2006.01)
*G06K 9/62* (2006.01)
(Continued)

(52) U.S. Cl.
CPC .......... *H04S 7/303* (2013.01); *G06K 9/00624* (2013.01); *G06K 9/6267* (2013.01);
(Continued)

(58) Field of Classification Search
CPC ...... H04S 7/303; H04S 3/008; H04S 2400/01; H04S 2400/11; G06K 9/00624; G06K 9/6267
See application file for complete search history.

(56) References Cited

U.S. PATENT DOCUMENTS 6,490,359 B1   12/2002   Gibson et al.
6,829,018 B2   12/2004   Lin et al.
(Continued)

FOREIGN PATENT DOCUMENTS

EP   3 343 347 A1   7/2018
GB   2543275 A      4/2017
(Continued)

OTHER PUBLICATIONS

International Search Report and Written Opinion for Application No. PCT/FI2017/050838 dated Mar. 29, 2018, 12 pages.
(Continued)

*Primary Examiner* — Mark Fischer
(74) *Attorney, Agent, or Firm* — Alston & Bird LLP (57) ABSTRACT

A method comprising: causing analysis of a portion of a visual scene; causing modification of a first sound object to modify a spatial extent of the first sound object in dependence upon the analysis of the portion of the visual scene corresponding to the first sound object; and causing rendering of the visual scene and the corresponding sound scene including of the modified first sound object with modified spatial extent.

20 Claims, 4 Drawing Sheets

(51) Int. Cl.
*H04S 3/00* (2006.01)
*G06K 9/00* (2006.01)

(52) U.S. Cl.
CPC .......... *H04S 3/008* (2013.01); *H04S 2400/01* (2013.01); *H04S 2400/11* (2013.01)

(56) References Cited

U.S. PATENT DOCUMENTS

| | | | |
|---|---|---|---|
| 9,372,251 | B2 | 6/2016 | Soulodre |
| 9,471,852 | B1 | 10/2016 | Feris et al. |
| 2014/0233917 | A1 | 8/2014 | Xiang |
| 2014/0270188 | A1 | 9/2014 | Hall et al. |
| 2015/0189457 | A1 | 7/2015 | Donaldson |
| 2018/0054689 | A1* | 2/2018 | Chen .................. G10L 19/20 |

FOREIGN PATENT DOCUMENTS

| | | |
|---|---|---|
| GB | 2543276 A | 4/2017 |
| WO | WO 2016/138168 A1 | 9/2016 |

OTHER PUBLICATIONS

Eronen, A., *Automatic Musical Instrument Recognition*, Master of Science Thesis, Tampere University of Technology (2001) 69 pages.

Fuhrmann, F., *Automatic Musical Instrument Recognition From Polyphonic Music Audio Signals*, Tesi Doctoral, Universitat Pompeu Fabra (2012) 237 pages.

Gkioxari, G. et al., *Using κ-Poselets for Detecting People and Localizing Their Keypoints*, [online] [retrieved Aug. 26, 2019]. Retrieved from the Internet: <https://www.cv-foundation.org/.../papers/Gkioxari_Using_k-Poselets_for_2014_CVPR_paper.pdf>. (2014) 8 pages.

Gkioxari, G. et al., *Contextual Action Recognition With R*CNN*, [online] [retrieved Aug. 26, 2019]. Retrieved from the Internet: openaccess.thecvf.com/content_iccv_2015/papers/Gkioxari_Contextual_Action_Recognition . . . (2015) 1080-1088.

Girshick, R., *Fast R-CNN*, [online] [retrieved Aug. 26, 2019]. Retrieved from the Internet: <https://arxiv.org/abs/1504.08083 (Sep. 27, 2015) 8 pages.

Glowacz, A. et al., *Sound Recognition of Musical Instruments With Application of FFT and K-NN Classifier With Cosine Distance*, Automatyka (2010) 15-22.

Harihara, B. et al., *Hypercolumns for Object Segmentation and Fine-Grained Localization*, [online] [retrieved Aug. 26, 2019]. Retrieved from the Internet: <https://www.cv-foundation.org/.../Hariharan_Hypercolumns_for_Object_2015_CVPR_paper.pdf.>, 447-456.

Pihlajamaki, T. et al., *Synthesis of Spatially Extended Virtual Sources With Time-Frequency Decomposition of Mono Signals*, J. Audio Eng. Soc., vol. 62, No. 7/8 (2014) 467-484.

Pinheiro, P. O. et al., *Learning to Refine Object Segments*, arXiv:1603.08695v2 (Jul. 26, 2016) 18 pages.

Pinheiro, P. O. et al., *Learning to Segment Object Candidates*, arXiv:1506.06204v2 (Sep. 1, 2015) 10 pages.

Van Dinther, R. et al., *Perception of Acoustic Scale and Size in Musical Instrument Sounds*, [online] [retrieved Aug. 5, 2019]. Retrieved from the Internet: <https://www.ncbi.nlm.nih.gov/pmc/articles/PMC2821800/>. (Oct. 2006) 36 pages.

Zagoruyko, S. et al., *A MultiPath Network for Object Detection*, arXiv:1604.02135v2 (Aug. 8, 2016) 14 pages.

Extended European Search Report for Application No. 17876577.2 dated Apr. 1, 2020, 9 pages.

\* cited by examiner

AUDIO PROCESSING TO MODIFY A SPATIAL EXTENT OF A SOUND OBJECT

CROSS-REFERENCE TO RELATED APPLICATIONS

The present application is a national phase entry of International Application No. PCT/FI2017/050838, filed Nov. 29, 2017, which claims priority to GB Application No. 1620422.4, filed Dec. 1, 2016, all of which are incorporated herein by reference in their entirety.

TECHNOLOGICAL FIELD

Embodiments of the present invention relate to audio processing. Some but not necessarily all examples relate to automatic control of audio processing.

BACKGROUND

Spatial audio rendering comprises rendering sound scenes comprising sound objects at respective positions.

BRIEF SUMMARY

According to various, but not necessarily all, embodiments of the invention there is provided a method comprising: causing analysis of a portion of the visual scene; causing modification of the first sound object to modify a spatial extent of the first sound object in dependence upon the analysis of the portion of the visual scene corresponding to the first sound object; and causing rendering of the visual scene and the corresponding sound scene including of the modified first sound object with modified spatial extent.

According to various, but not necessarily all, embodiments of the invention there is provided a method comprising: causing detection of a visual object in a portion of a visual scene; causing determination that the portion of the visual scene has a corresponding first sound object; causing modification of the first sound object to modify a spatial extent of the first sound object; causing rendering of the visual scene and the corresponding sound scene including rendering of the visual scene and rendering of the modified first sound object with modified spatial extent in the corresponding sound scene.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

In this description, "rendering" means providing in a form that is perceived by a user. "Displaying" is a form of rendering for a visual scene and means providing in a form that is perceived visually (viewed) by the user.

Figure 1A:
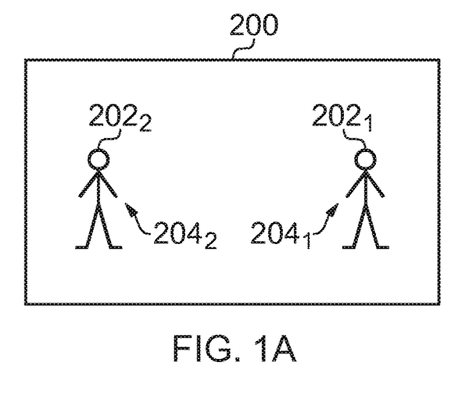
FIG. 1A illustrates an example of a visual scene and FIG. 1B illustrates an example of a corresponding sound scene before application of the method.

FIG. 1A illustrates an example of a visual scene 200 as rendered. The visual scene may have been captured (recorded) by one or more cameras and/or generated. The visual scene 200 may be an image such as a still image or video image defined by a data structure.

The visual scene 200 may be arbitrarily separated into portions 202 including in this example a first portion $202_1$ and a second portion $202_2$. The first portion $202_1$ comprises visual content $204_1$ and the second portion $202_2$ comprises visual content $204_2$.

Figure 1B:
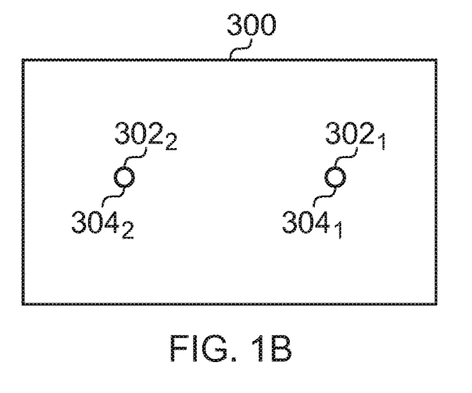

FIG. 1B illustrates an example of a sound scene 300 as rendered. The sound scene may have been captured (recorded) by one or more microphones and/or generated. The sound scene 300 may be captured (recorded) audio defined by one or more data structures.

A multichannel audio signal can represent a sound scene 300 relative to an origin and can be rendered by an audio decoder to produce a rendered sound scene to a listener at the origin. The sound scene 300 comprises a plurality of sound objects 302 at different positions r and with different spatial extents 304.

The sound scene 300 comprises one or more sound objects 302. A sound object 302 is a sound that may be located within the sound scene 300. A rendered sound object 302 represents a sound rendered from a particular position r with a particular spatial extent 304.

The sound scene 300, in this example, comprises a sound object $302_1$ at position $p_1$ and with spatial extent 304, and a sound object $302_2$ at position $p_2$ and with spatial extent $304_2$.

The rendered sound scene 300 and the rendered visual scene 200 are 'corresponding'. That is, the rendered sound scene 300 and the rendered visual scene 200 are time and space aligned (they occupy the same common shared space at the same time) and a notional listener whose point of view defines the sound scene 300 and a notional viewer whose point of view defines the visual scene 200 are at the same position and orientation: that is they have the same point of view.

"Correspondence" or "corresponding" when used in relation to a sound object 302 and a portion 202 of the visual space 200 means that the sound object 302 when rendered at a position in the sound space 300 and the portion 202 of the visual space 200 when rendered in the visual space 200 are both rendered at the same position within the common shared space.

In the example of FIG. 1B, the sound scene 300 comprises a first sound object $302_1$ that corresponds with a first portion $202_1$ of the visual scene 200 in FIG. 1A. In this example, the sound scene 300 also comprises a second sound object $302_2$ that corresponds with a second portion $202_2$ of the visual scene 200 in FIG. 1A.

Figure 2A:
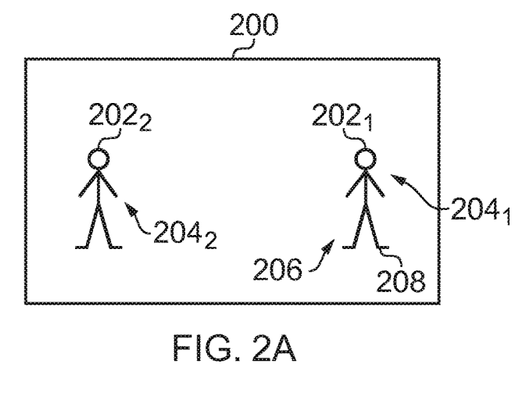
FIG. 2A illustrates an example of the visual scene and FIG. 2B illustrates an example of the corresponding sound scene after application of the method.
Figure 2B:
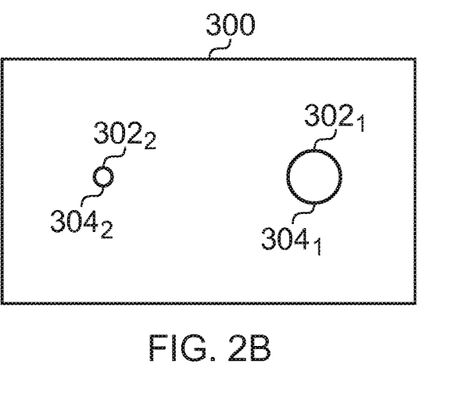

FIG. 2A illustrates a visual scene 200 as rendered and FIG. 2B illustrates the corresponding sound scene 300, as rendered, including a rendered first sound object $302_1$ of modified spatial extent 304. The spatial extent 304 of the first sound object 302, is dependent upon an analysis of a portion $202_1$ of the visual scene 200 corresponding to the first sound object $302_1$.

The visual scene 200 is the same visual scene as rendered in FIG. 1A.

The sound scene 300 is the same sound scene as rendered in FIG. 1B except that the spatial extent 304 of the first sound object $302_1$ has been modified. The sound scene 300 comprises a modified first sound object $302_1$ that corresponds with the first portion $202_1$ of the visual scene 200 in FIG. 1B. As a consequence of the first portion $202_1$ of the visual scene 200, the corresponding first sound object $302_1$ has an automatically modified spatial extent $304_1$' (the spatial extent 304 of the first sound object $302_1$ has increased). In FIG. 1B, the first sound object $302_1$ has a smaller spatial extent 304 than in FIG. 2B.

As will be described in more detail below, in some examples modification of the spatial extent $304_1$' of the first sound object $302_1$ is in dependence upon an analysis of the first portion $202_1$ of the visual scene 200 corresponding to the first sound object $302_1$. For example, processing may be used to detect that a visual object 206 is in a first portion $202_1$, of a visual scene 200, that has a corresponding first sound object $302_1$. The spatial extent 304 of the first sound object $302_1$ may, for example, be modified to have a modified spatial extent 304' corresponding to the spatial extent 208 of the corresponding visual object 206.

The sound scene 300 may be considered to be a collection of spatial channels where each spatial channel is a different direction. In some examples, the collection of spatial channels may be globally defined for all sound objects. In other examples, the collection of spatial channels may be locally defined for each sound object. The collection of spatial channels may be fixed or may vary dynamically. In some but not necessarily all examples, each spatial audio channel may be rendered as a single sound source using amplitude panning.

For example, in spherical polar co-ordinates the direction of the spatial channel $S_{nm}$ may be represented by the couplet of polar angle $\vartheta_n$ and azimuthal angle $\phi_m$. Where $\vartheta_n$ is one polar angle in a set of N possible polar angles and $\phi_m$ is one azimuthal angle in a set of M possible azimuthal angles.

A sound object 302 at position z may be associated with the spatial channel $S_{nm}$ that is closest to Arg(z).

If a sound object 302 is associated with a spatial channel $S_{nm}$ then it is rendered as a point source.

A sound object 302 may however have spatial extent 304 and be associated with a plurality of spatial audio channels. For example a sound object may be simultaneously rendered in a set of spatial channels {S}' defined by Arg(z) and a spatial extent 304 of the sound object. That set of spatial channels {S}' may, for example, include the set of spatial channels $S_{n'm'}$ for each value of n' between n$-\delta_n$ and n$+\delta_n$ and of m' between n$-\delta_m$ and n$+\delta_m$, where n and m define the spatial channel closest to Arg(z) and $\delta_n$ and $\delta_m$ define in combination a spatial extent 304 of the sound object 302. The value of $\delta_n$, defines a spatial extent 304 in a polar direction and the value of $\delta_m$ defines a spatial extent 304 in an azimuthal direction.

The number of spatial audio channels and their spatial relationship in the set of spatial channels {S}' is dependent upon the desired spatial extent 304 of the sound object 302.

Figure 3:
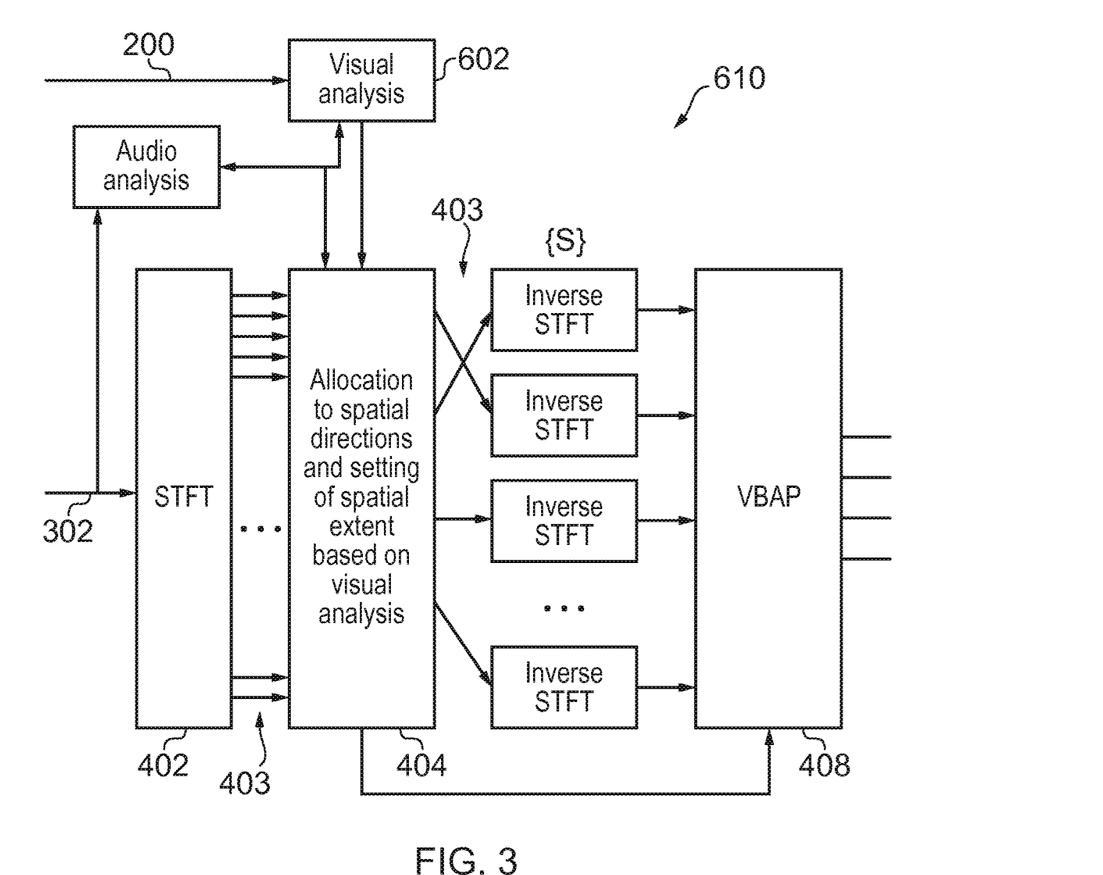
FIG. 3 illustrates an example of a system for modifying an extent of a sound object.

As illustrated in FIG. 3, a sound object 302 may be simultaneously rendered in a set of spatial channels {S}' by decomposing 402 the audio signal representing the sound object 302 into multiple different frequency bands thereby creating multiple spectrally-limited audio signals 403 and placing 404 the spectrally-limited audio signals into the set of spatial audio channels {S}. For example, each spectrally-limited audio signal is placed in one spatial audio channel and each spatial audio channel comprises only one spectrally-limited audio signal, that is, there is a one-to-one mapping between the spectrally-limited audio signals and the spatial audio channels. In some but not necessarily all examples, each spectrally-limited audio signal may be rendered as a single sound source using amplitude panning 408.

For example, if the set of spatial channels {S} comprised X channels, the audio signal representing the sound object would be separated into X different spectrally-limited audio signals in different non-overlapping frequency bands. This may be achieved using a filter bank comprising a band pass limited filter for each spatial audio channel or by using digital signal processing to distribute time-frequency bins to different spatial audio channels. Each of the X different spectrally-limited audio signals in different non-overlapping frequency bands would be provided to only one of the set of spatial audio channels {S}. Each of the set of spatial audio channels {S} would comprise only one of the X different spectrally-limited audio signals in different non-overlapping frequency bands.

Where digital signal processing is used to distribute time-frequency bins to different spatial audio channels, then a short-term Fourier transform (STFT) may be used to transform from the time domain to the frequency domain, where selective filtering occurs for each frequency band followed by an inverse transform to create the spectrally-limited audio signals for that frequency band. The different spectrally-limited audio signals may be created using the same time period or different time periods for each STFT. The different spectrally-limited audio signals may be created by selecting frequency bands of the same bandwidth (different center frequencies) or different bandwidths. The different spatial audio channels {S} into which the spectrally-limited audio signals are placed may be defined by a constant angular distribution e.g. the same solid angle ($\Delta\Omega$=sin $\theta\cdot\theta\cdot\Delta\theta\cdot\Delta\phi$ in spherical coordinates) or by a non-homogenous angular distribution e.g. different solid angles.

Which spectrally-limited audio signal is allocated to which spatial audio channel in the set of spatial audio channels {S} may be controlled by random allocation or may be determined based on a set of predefined rules.

The predefined rules may, for example, constrain spatial-separation of spectrally-adjacent spectrally-limited audio signals to be above a threshold value. Thus spectrally-limited audio signals in adjacent frequency bands may be separated spatially so that they are not spatially adjacent. In some examples, effective spatial separation of the multiple frequency bands may be maximized.

The predefined rules may additionally or alternatively define how the spectrally-limited audio signals are distributed amongst the set of spatial audio channels {S}. For example, a low discrepancy sequence such as a Halton sequence, for example, may be used to pseudo-randomly distribute the spectrally-limited audio signals amongst the set of spatial audio channels {S}.

The rules may specify that movement of a sound object 302 having an extended spatial extent 304 should be achieved by not moving all of the multiple spectrally-limited audio signals distributed amongst different spatial audio channels simultaneously to different spatial audio channels but should be achieved by keeping a first set of the multiple spectrally-limited audio signals stationery with respect to their current spatial audio channels and moving a second set of the multiple spectrally-limited audio signals to different spatial audio channels.

The distance of a sound object 302 from the origin may be controlled by using a combination of direct and indirect processing of the audio signals representing a sound object 302.

The audio signals are passed in parallel through a "direct" path and one or more "indirect" paths before the outputs from the paths are mixed together. The direct path represents audio signals that appear, to a listener, to have been received directly from an audio source and an indirect (decorrelated) path represents audio signals that appear to a listener to have been received from an audio source via an indirect path such as a multipath or a reflected path or a refracted path. Modifying the relative gain between the direct path and the indirect paths, changes the perception of the distance D of the sound object 302 from the listener in the rendered sound scene 300. Increasing the indirect path gain relative to the direct path gain increases the perception of distance. The decorrelated path may, for example, introduce a pre-delay of at least 2 ms.

In some situations, for example when the sound scene 300 is rendered to a listener through a head-mounted audio output device, for example headphones using binaural audio coding, it may be desirable for the rendered sound space to remain fixed in space when the listener turns their head in space. This means that the rendered sound space needs to be rotated relative to the audio output device by the same amount in the opposite sense to the head rotation. The orientation of the rendered sound space tracks with the rotation of the listener's head so that the orientation of the rendered sound space remains fixed in space and does not move with the listener's head. The system uses a transfer function to perform a transformation T that rotates the sound objects within the sound space. For example, a head related transfer function (HRTF) interpolator may be used for binaural audio. As another example, Vector Base Amplitude Panning (VBAP) may be used for loudspeaker format (e.g. 5.1) audio.

Figure 4:
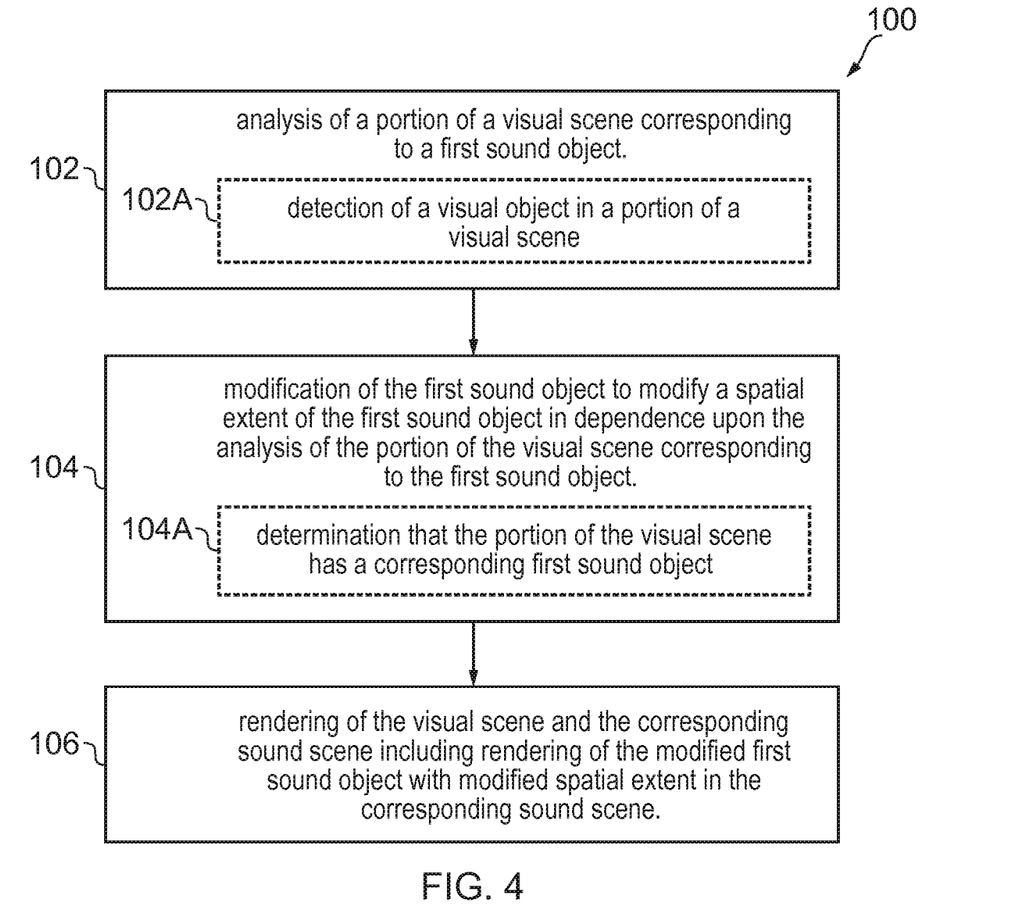
FIG. 4 illustrates an example of a method.

FIG. 4 illustrates an example of a method 100 for modifying a rendered sound object 302.

At block 102, the method 100 comprises causing analysis of a portion 202 of the visual scene 200.

At block 104, the method 100 comprises causing modification of the first sound object $302_1$ to modify a spatial extent $304_1$ of the first sound object $302_1$ in dependence upon the analysis of the portion 202 of the visual scene 200 corresponding to the first sound object $302_1$.

At block 106, the method 100 comprises causing rendering of the visual scene 200 and the corresponding sound scene 300 including rendering of the modified first sound object $302_1$ with modified spatial extent $304_1$' in the corresponding sound scene 300.

In the event that the first portion $202_1$ of the visual scene 200 does not comprise a visual object 206 then there would be no modification of the first sound object $302_1$ In this example, it is a requirement for modification of the extent $304_1$ of the first sound object $302_1$ for two conditions to be fulfilled—the first sound object $302_1$ corresponds to a portion 202 of the visual scene 200 and that portion 202 of the visual scene 200 comprises a visual object 206.

In some but not necessarily all examples, all of the blocks 102, 104, 106 are be performed automatically. In some other alternative examples, only some (or none) of the blocks 102, 104, 106 are performed automatically because, for example, one or more of the blocks 102, 104, 106 is performed in accordance with or in response to a user input command.

In some examples, the visual analysis caused at block 102 is performed automatically for all portions 202 of the visual scene 200. In some examples, the visual analysis caused at block 102 is performed automatically for selected portions 202 of the visual scene 200, for example, those portions 202 selected automatically because they comprise at least one visual object 206.

In some examples, the visual analysis caused at block 102 is performed on at least one user-selected portion 202 of the visual scene 200 selected by a user input command. In some examples, the visual analysis caused at block 102 is performed for at least one selected portion 202 of the visual scene 200, for example, a portion 202 selected because it comprises a visual object 206 selected by or in response to a user input command.

In some examples, the modification of the first sound object $302_1$ caused at block 104 is performed automatically. In some examples, the modification of the first sound object $302_1$ caused at block 104 is performed in response to a user input command. In some examples, the modification of the first sound object $302_1$ caused at block 104 is performed on a sound object 302 selected by or in response to a user input command.

In some but not necessarily all examples, at sub-block 102A the method comprises causing detection of a visual object 206 in a portion of a visual scene 200. Then at sub-block 104A, the method 100 comprises causing determination that the portion 202 of the visual scene 200 has a corresponding first sound object $302_1$.

In some but not necessarily all examples, the first sound object 302 is modified in dependence upon the detected visual object 206. For example, the first sound object 302 is modified in dependence upon a classification of the detected visual object 206 and/or in dependence upon a size of the detected visual object 206. In particular, the spatial extent 304 of the sound object 302 may be modified in dependence upon the detected visual object 206, for example the size (spatial extent 208) of the detected visual object 206.

In some but not necessarily all examples, detection of a visual object 206 is based on digital image analysis, for example, feature extraction using a convolutional neural network or otherwise.

This may be sufficient to identify the presence of an object and estimate its outline shape.

It may in some examples or in some circumstance be assumed that the detected visual object 206 is the source of all of the sound object 302. The spatial extent 304 of the sound object 302 may then be modified, for example to match a size (spatial extent 208) of the detected visual object 206.

It other examples or circumstances, it may not be assumed that a detected visual object 206 is the source of the sound object or all of the sound object. In such circumstances it may be desirable to further classify the detected visual object 206.

A trained multi-layer convolutional neural network may be used for object classification. Examples of suitable neural networks are available from the Caffe library the Berkeley Vision and Learning Center (BVLC). In one example, a multi-stage process may be used. First proposed regions are identified. Then a fixed-length feature vector is extracted from each proposal region using a trained CNN. Then each region specific feature vector is classified with category-specific linear state vector machines (SVM).

In some examples or in some circumstances, classification of the visual object 206 as a possible sound source e.g. musical instrument, person etc may be required before the spatial extent 304 of the sound object 302 is modified, for example to match a size (spatial extent 208) of that sound source's corresponding visual object 206.

Figure 5A:
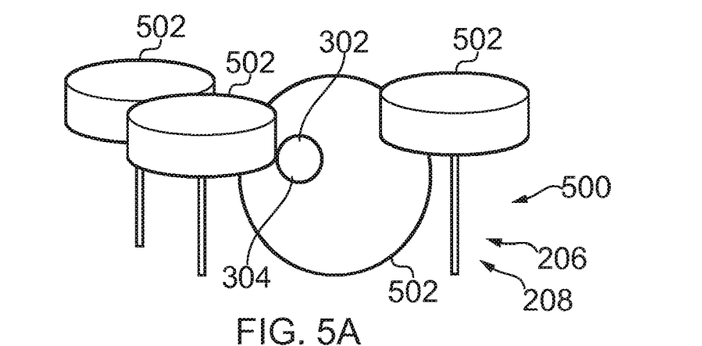
FIG. 5A illustrates an example of a visual scene and corresponding sound scene combined before application of the method.
Figure 5B:
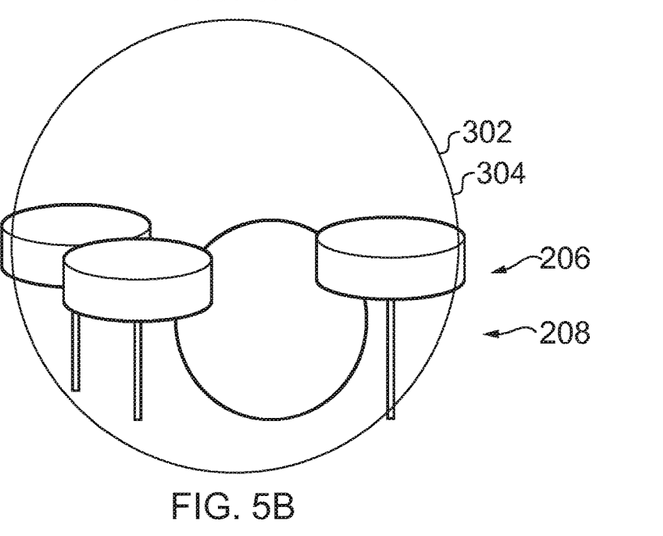
FIG. 5B illustrates an example of a visual scene and corresponding sound scene combined after application of the method.
Figure 5C:
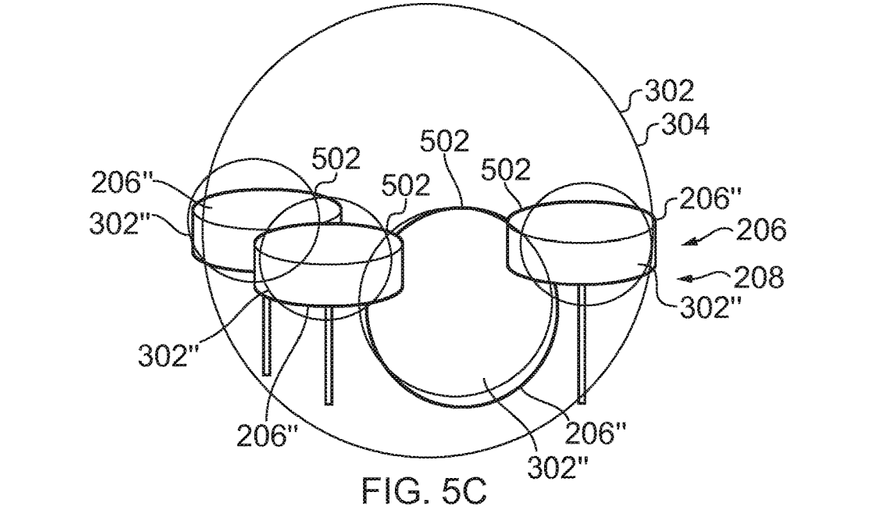
FIG. 5C illustrates an example of a visual scene and corresponding sound scene combined after application of the method.

FIGS. 5A, 5B and 5C illustrate an example of a combined visual scene 200 and sound scene 300. The visual scene 200 comprises a large musical instrument, for example a piano or set of drums. In this example, the musical instrument 500 is a set of drums and the musical instrument 500, in this example, comprises separate instrument components 502 each of which is a separate sound source. The musical instrument is a visual object 202 in the visual space 200 that has spatial extent 204. The sound scene 300 comprises a sound source 302. Initially the sound source 302 is initially a point source (FIG. 5A) but after application of the method 100, the spatial extent 304 of the sound object 302 is increased, for example, to match the spatial extent of the visual object 202 (musical instrument 500).

In some examples or circumstances, the sound object 302 may be separated into separate sound sub-objects that can be separately positioned and modified. For example, where the visual object 206 has been classified as a musical instrument or other sound source 500 then the audio frequency range associated with that sound source may be used to separate the sound object into one sound object associated with the classified sound source and another sound object. The sound object associated with the classified sound source comprises those or most of those frequencies of the sound object that lie within the determined frequency range and the other sound object comprises the remaining frequencies. The sound object associated with the classified sound source is then positioned at the sound source 500 with a spatial extent 304 matching the spatial extent 208 of the visual object 206 corresponding to that sound source 500. The spatial audio channels may be allocated frequencies associated with the sound source so that there is a greater likelihood that the frequencies associated with the classified sound source will be allocated to the spatial audio channels that cover the classified sound source and there is less likelihood that the frequencies not associated with the classified sound source will be allocated to the spatial audio channels that cover the classified sound source.

FIG. 5C illustrate an example similar to FIG. 5B except that the frequency bands associated with the sound object 302 that are distributed over the spatial extent 304 have a weighted distribution such that those frequency bands predominantly associated with a particular (classified) instrument component 502 are preferentially allocated to the spatial audio channels that cover the particular (classified) instrument component 502. The (classified) instrument component 502 represent visual sub-objects 206" and the spatial audio channels that cover a visual sub-object (and have a modified distribution of frequency bands) represent sound sub-objects 302". The rules for allocating frequency bins to spatial audio channels may be the same for sound sub-objects 302" as for sound objects 302—they may be allocated according to rules regarding spatial separation of similar frequency bins, for example.

In some examples or circumstances, the visual object 206 may be classified into a collection of visual sub-objects and the first sound object that corresponds to the visual object 206 is split into sound sub-objects. For example, where a visual sub-object has been classified as a particular musical instrument or other sound source then the audio frequency range associated with that sound source may be used to separate from the sound object those frequencies of the sound object that lie within the determined frequency range to form a sound sub-object. This may be repeated for each musical instrument (or component) classified. The sound sub-objects associated with the classified sound sources are then positioned at the respective sound sources with a spatial extent 304, for example, matching a spatial extent 208 of the visual sub-object corresponding to that sound source. Thus the position and spatial extent 304 of the sound sub-objects are controlled so that they correspond with the visual sub-objects.

In some examples or circumstances, a sound object may be classified as one or more sound sources (e.g. different musical instruments) which may then be treated as sound sub-objects each with a different (distinct, non-overlapping) frequency band. The classification of a sound object (or sound objects) may be used to direct the detection of visual objects 206 such that a corresponding visual object 206 is identified for each classified sound object.

The classification of a sound object may for example comprise detecting silence and excluding silence periods from processing, then processing the remaining sound object. The sound object may be windowed and then a fast Fourier transform applied to extract a feature vector. A trained neural network may be used to classify the feature vector. The cost used in the neural network may be based on a cosine distance $d_{cos}(x, y)$ between the feature vector $(x_i)$ and an average feature vector $(y_i)$ where $d_{cos}(x, y)=1-(d_{xy}/d_x d_y)$, $d_{xy}=\text{Sum}_n (x_i y_i)$, $d_{xx}=[\text{Sum}_n (x_i x_i)]^{1/2}$, $d_{yy}=[\text{Sum}_n (y_i y_i)]^{1/2}$.

While the above examples, assume that only a portion 202 of the visual scene 200 corresponds to only a single sound object $302_1$, in other examples a portion 202 of the visual scene 200 may include one or more portions of the visual scene that each have one or more corresponding sound objects 302 that are modified in spatial extent 304.

While the above example, assumes that only one portion 202n of the visual scene 200 both corresponds to a single sound object $302_1$ and comprises a visual object 206, in other examples other portions 202n of the visual scene 200 both correspond to one or more other sound objects 302 and comprise one or more other visual objects 206. In this scenario, the method 100 may be repeated for each other portion of the visual scene 200, causing the modification of spatial extent 304 of the other sound objects 302.

Object tracking may be used to help classify a visual object 206 as a sound source. For example, tracking the object on a large macro-scale allows one to create a frame of reference that moves with the object. That frame of reference can then be used to track time-evolving changes of shape or appearance of the object, by using temporal differencing with respect to the object. This may be used to disambiguate between an unused musical instrument and a musical instrument that is being played.

The modification of the spatial extent 304 of the first sound object 302 comprises increasing the spatial extent $304_1$ of the first sound object $302_1$ so that it is no longer rendered as a point sound source. In some but not necessarily all examples, the spatial extent $304_1$ of the first sound object $302_1$ after it has been modified is the same as a spatial extent 208 of the first visual object 206 corresponding to the first sound object $302_1$.

Spatial extent of a sound object may be considered to be a length L along a vector v in the sound space or lengths $L_n$ along a set of vectors $v_n$ in the sound space. In some examples, the set of vectors $\{v_n\}$ may be orthogonal vectors or a minimum set of vectors that span the sound space.

Spatial extent of a visual object 206 may be considered to be a length X along a vector v in the visual space or lengths $X_n$ along a set of vectors $v_n$ in the visual space. In some examples, the set of vectors $\{v_n\}$ may be orthogonal vectors or a minimum set of vectors that span the visual space.

As the sound space and visual space correspond, the set of vectors $\{v_n\}$ are the same vectors in each space.

In some but not necessarily all examples, the spatial extent $304_1$ of the first sound object $302_1$ after it has been modified, is the same as a spatial extent of a first visual object 206 corresponding to the first sound object $302_1$ This means that for at least one value of n or for a particular value of n, $L_n=X_n$.

In some but not necessarily all examples, the spatial extent $304_1$ of the first sound object $302_1$ after it has been modified, is exactly the same as a spatial extent of a first visual object 206 corresponding to the first sound object $302_1$. This means that for all values of n $L_n=X_n$.

Modification of the first sound object $302_1$ such that it has a modified spatial extent $304_1'$ occurs conditionally in dependence upon a relative size of the spatial extent $304_1$ of the first sound object $302_1$ and the spatial extent of a visual object 206 in the visual scene corresponding to the first sound object $302_1$. For example, in some but not necessarily all examples, the spatial extent 304 of the first sound object 302, may not exceed a spatial extent of a first visual object 206 corresponding to the first sound object $302_1$.

The modification of the spatial extent 304 of a sound object 302 may occur automatically, in real time.

Referring back to FIG. 3, it will therefore be appreciated that the allocation of frequency bands to spatial channels performed by block 404 is controlled by a visual analysis block 602 which performs digital processing on the imaged visual scene 200. The visual analysis block 602 analyzes the portion of the visual scene 200 corresponding to the first sound object and causes the block 404 to modify the spatial extent of the first sound object 302 in dependence upon the analysis of the portion of the visual scene corresponding to the first sound object 302. The output from the system 610 illustrated in FIG. 3 is used to render the sound scene including of the modified first sound object with modified spatial extent.

In some examples, a weather condition may be determined from the visual analysis. For example, it may be inferred that it is raining because the ground is wet and/or umbrellas are raised and/or car windscreen wipers are active and/or it may be inferred that it is windy because trees or other vegetation are moving in the wind. Where a sound object 302 (or sound sub-object 302") is determined to relate to weather it may be spread across all available spatial audio channels.

Referring back to FIG. 3, it will also be appreciated that the allocation of frequency bands to spatial channels performed by block 404 may additionally be controlled by other parameters. For example positioning data (not illustrated) may be used to accurately locate an audio object recorded at an up close microphone or to locate a tagged object, for example, and these may be used to constrain the visual analysis of the visual scene 200 to a particular location. For example, an output from an audio analysis block 604 which performs digital processing on the sound object 302 may be used to classify a sound source and control the creation of sound sub-objects or assist in the classification of visual objects or visual sub-objects.

Referring back to FIGS. 1A and 1B which represent respectively a visual scene 200 and a corresponding sound scene 300 without application of the method 100 and FIGS. 2A and 2B which represent respectively a visual scene 200 and a corresponding sound scene 300 after application of the method 100, it will be appreciated that the method 100 comprises:

causing detection of a visual object 206 in a portion of a visual scene 200;

causing determination that the portion 202 of the visual scene 200 has a corresponding first sound object 302;

causing modification of the first sound object 302 to modify a spatial extent 304 of the first sound object 302;

causing rendering of the visual scene 200 and the corresponding sound scene 300 including rendering of the visual scene 200 and rendering of the modified first sound object 302 with modified spatial extent 304 in the corresponding sound scene 300.

In some but not necessarily all examples, the visual scene 200 may be a virtual visual scene. A virtual visual scene may, for example be a mediated reality scene, a virtual reality scene or an augmented reality scene. A virtual reality scene displays a fully artificial virtual visual scene. An augmented reality scene displays a partially artificial, partially real virtual visual scene.

The virtual visual scene may comprise a real visual scene supplemented by one or more visual elements displayed by an apparatus to a user. The visual elements may be one or more computer-generated visual elements. In a see-through arrangement, the virtual visual scene comprises the actual real visual scene which is seen through a display of the supplemental visual element(s). In a see-video arrangement, the virtual visual scene comprises a displayed real visual scene and displayed supplemental visual element(s).

The mediated reality, augmented reality or virtual reality may be user interactive-mediated. In this case, user actions at least partially determine what happens within the virtual visual scene. This may enable interaction with a virtual object such as a visual element.

The mediated reality, augmented reality or virtual reality may be perspective-mediated. In this case, user actions determine a point of view within a virtual visual space, changing the virtual visual scene. Where the user's point of view determines the point of view within the virtual visual space, the mediated reality, augmented reality or virtual reality is first-person perspective-mediated. In some examples, a point of view may be changed by a user changing an orientation of their head or view point and/or a user changing a direction of their gaze. A head-mounted apparatus 30 may be used to enable first-person perspective mediation by measuring a change in orientation of the user's head and/or a change in the user's direction of gaze. For example, accelerometers, electronic gyroscopes or electronic compasses may be used to determine a change in an orientation of a user's head or view point and a consequential change in the real direction of the real point of view. For example, pupil tracking technology, based for example on computer vision, may be used to track movement of a user's eye or eyes and therefore determine a direction of a user's gaze and consequential changes in the real direction 15 of the real point of view 14.

FIG. 4 illustrates an example of an apparatus 30 that is operable to enable the method 100.

The apparatus 30 comprises a display 32 for displaying the visual scene 200 to a user in a form that is perceived visually by the user. The display 32 may be a visual display that provides light that displays the visual scene 200 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

The apparatus 30 comprises an audio rendering device 34 for rendering the sound scene 300 simultaneously with the display of the corresponding visual scene 200. The audio rendering device 34 may be an interface or may be a collection of one or more loudspeakers.

The audio rendering device 34 is controlled in this example but not necessarily all examples by the controller 42.

Implementation of a controller 42 may be as controller circuitry. The controller 42 may be implemented in hardware alone, have certain aspects in software including firmware alone or can be a combination of hardware and software (including firmware).

Figure 6A:
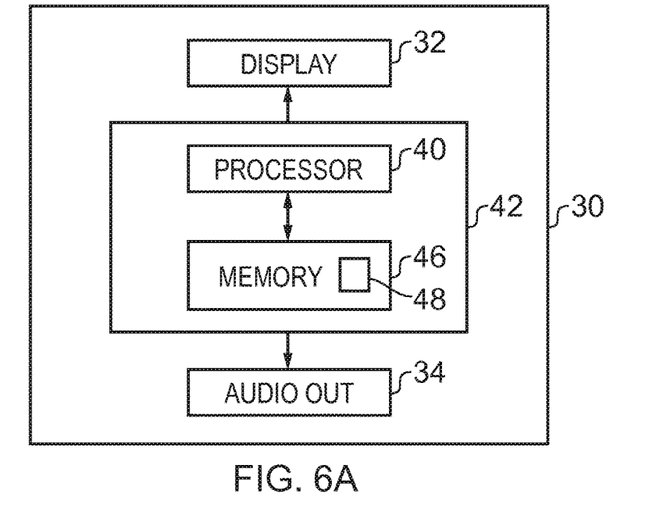
FIG. 6A illustrates an example of an apparatus for performing the method.

As illustrated in FIG. 6A the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods 100 illustrated in FIG. 3.

The apparatus 30 may be a head-mounted apparatus that is moved automatically when a head of the user moves. The head-mounted apparatus may house sensors for point of view detection and/or selection gesture detection.

The head-mounted apparatus may be a see-through arrangement for augmented reality that enables a live real visual scene to be viewed while one or more visual elements are displayed by the display to the user to provide in combination a virtual visual scene. In this case a visor, if present, is transparent or semi-transparent so that the live real visual scene 12 can be viewed through the visor.

The head-mounted apparatus may be operated as a see-video arrangement for augmented reality that enables a live or recorded video of a real visual scene to be displayed by the display 32 for viewing by the user while one or more visual elements are simultaneously displayed by the display 32 for viewing by the user. The combination of the displayed real visual scene and displayed one or more visual elements provides the virtual visual scene to the user. In this case a visor is opaque and may be used as display 32.

Other examples of apparatus 30 that enable display of at least parts of the virtual visual scene 22 to a user may be used.

The apparatus 30 therefore comprises:
at least one processor 40; and
at least one memory 46 including computer program code 48;
the at least one memory 46 and the computer program code 48 configured to, with the at least one processor 40, cause the apparatus 30 at least to perform:
  causing analysis of a portion 202 of the visual scene 200;
  causing modification of the first sound object 302 to modify a spatial extent 304 of the first sound object 302 in dependence upon the analysis of the portion 202 of the visual scene 200 corresponding to the first sound object 302; and
  causing rendering of the visual scene and the corresponding sound scene including of the modified first sound object with modified spatial extent.

In some but not necessarily all examples, the at least one memory 46 and the computer program code 48 configured to, with the at least one processor 40, cause the apparatus 30 at least to perform:
  causing detection of a visual object 206 in a portion 202 of a visual scene 200;
  causing determination that the portion 202 of the visual scene 200 has a corresponding first sound object 302;
  causing modification of the first sound object 302 to modify a spatial extent 304 of the first sound object 302;
  causing rendering of the visual scene 200 and the corresponding sound scene 300 including rendering of the visual scene 200 and rendering of the modified first sound object 302 with modified spatial extent 304 in the corresponding sound scene 300.

Figure 6B:
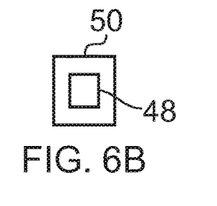
FIG. 6B illustrates an example of computer program for performing the method.

As illustrated in FIG. 6B, the computer program 48 may arrive at the apparatus 30 via any suitable delivery mechanism 50. The delivery mechanism 50 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 3 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
causing analysis of a portion of a visual scene;
detecting, based on the analysis, a visual object corresponding to a first sound object;
determining, based on the analysis, a classification or size of the visual object;
causing modification of the first sound object to modify a spatial extent of the first sound object in dependence upon the determined classification or size of the visual object; and
causing rendering of the visual scene and the corresponding sound scene including the modified first sound object comprising the modified spatial extent.

2. A method as claimed in claim 1, wherein causing modification of the first sound object to modify the spatial extent of the first sound object comprises causing modification of the spatial extent of the first sound object in dependence upon the visual object detected during analysis of the portion of the visual scene.

3. A method as claimed in claim 2, wherein the spatial extent of the first sound object is one or more lengths along one or more vectors in a sound space; and wherein the spatial extent of the visual object is one or more lengths along one or more vectors in a visual space.

4. A method as claimed in claim 2, wherein the visual object is classified by a trained multi-layer convolutional neural network.

5. A method as claimed in claim 1, wherein causing modification of the first sound object to modify the spatial extent of the first sound object comprises causing modification of the spatial extent of the first sound object in dependence upon a spatial extent of the visual object detected during analysis of the portion of the visual scene.

6. A method as claimed in claim 1, wherein causing modification of the first sound object to modify the spatial extent of the first sound object further comprises causing splitting the first sound object that corresponds to the visual object into sound sub-objects; and controlling positioning and spatial extent of the sound sub-objects.

7. A method as claimed in claim 6, further comprising causing classification of the visual object into visual sub-objects, wherein controlling the positioning and spatial extent of the sound sub-objects correspond with the visual sub-objects.

8. A method as claimed in claim 1, wherein the spatial extent of the first sound object after it has been modified is the same as a spatial extent of the visual object corresponding to the first sound object.

9. A method as claimed in claim 1, wherein the modification of the spatial extent of the first sound object comprises increasing the spatial extent of the first sound object.

10. A method as claimed in claim 1, wherein modification of the spatial extent of the first sound object comprises adapting the first sound object so that it is no longer rendered as a point sound source.

11. A method as claimed in claim 1, wherein modification of the spatial extent of a sound object occurs automatically, in real time.

12. A method comprising:
causing analysis of a portion of a visual scene;
causing modification of a first sound object to modify a spatial extent of the first sound object in dependence upon the analysis of the portion of the visual scene corresponding to the first sound object, wherein modification of the spatial extent of the first sound object comprises dividing an audio signal representing the first sound object into different frequency bands to create multiple spectrally-limited audio signals and placing each of the multiple spectrally-limited audio signals into different spatial audio channels; and
causing rendering of the visual scene and the corresponding sound scene including the modified first sound object with modified spatial extent.

13. A method as claimed in claim 12, wherein the multiple spectrally-limited audio signals are placed randomly into a set of spatial audio channels or wherein the multiple spectrally-limited audio signals are placed in spatial audio channels according to predefined rules.

14. A method as claimed in claim 13, wherein the predefined rules specify spatial-separation of spectrally-adjacent and spectrally-limited audio signals above a threshold value and/or wherein the rules specify that movement of a sound object having an extended spatial extent is achieved by not moving all of the multiple spectrally-limited audio signals distributed amongst different spatial audio channels simultaneously to different spatial audio channels but is achieved by keeping a first set of the multiple spectrally-limited audio signals stationery with respect to their spatial audio channels and moving a second set of the multiple spectrally-limited audio signals to different spatial audio channels.

15. An apparatus comprising at least one processor; and at least one memory including computer program code; the at least one memory and the computer program code configured to, with the at least one processor, cause the apparatus to:
cause analysis of a portion of a visual scene;
detect, based on the analysis, a visual object corresponding to a first sound object;
determine, based on the analysis, a classification or size of the visual object;
cause modification of the first sound object to modify a spatial extent of the first sound object in dependence upon the determined classification or size of the visual object; and
cause rendering of the visual scene and the corresponding sound scene including the modified first sound object comprising the modified spatial extent.

16. The apparatus as claimed in claim 15, wherein the modification is caused to modify the spatial extent of the first sound object in dependence upon the visual object detected during analysis of the portion of the visual scene.

17. The apparatus as claimed in claim 16, wherein the modification is caused to modify the spatial extent of the first sound object in dependence upon the spatial extent of the visual object detected during analysis of the portion of the visual scene.

18. The apparatus as claimed in claim 15, wherein the modification of the first sound object to modify the spatial extent of the first sound object further comprises splitting the first sound object that corresponds to the visual object into sound sub-objects; and controlling positioning and spatial extent of the sound sub-objects.

19. The apparatus as claimed in claim 18, is further caused to classify the visual object into visual sub-objects, wherein controlling the positioning and spatial extent of the sound sub-objects correspond with the visual sub-objects.

20. The apparatus as claimed in claim 15, further comprising a display and an audio rendering device.

* * * * *